J. H. WAGENHORST.
DEMOUNTABLE RIM FOR AUTOMOBILE WHEELS.
APPLICATION FILED JUNE 11, 1919.
1,383,679.
Patented July 5, 1921.
2 SHEETS—SHEET 2.
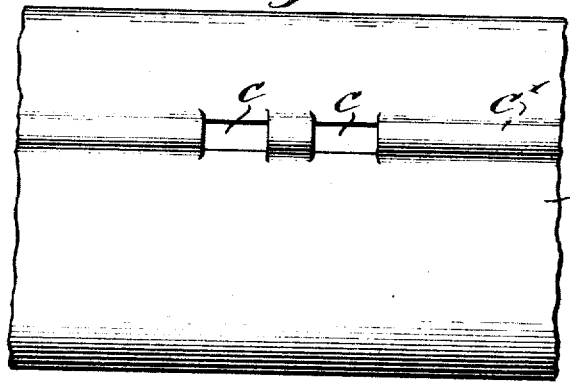
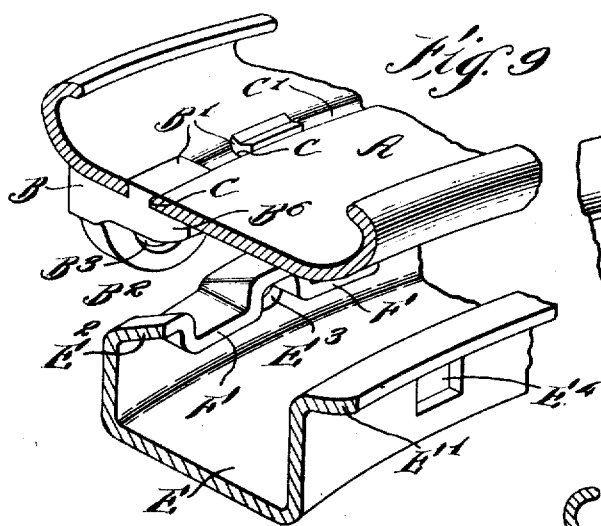
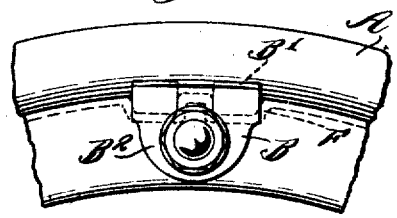
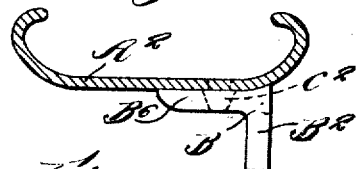
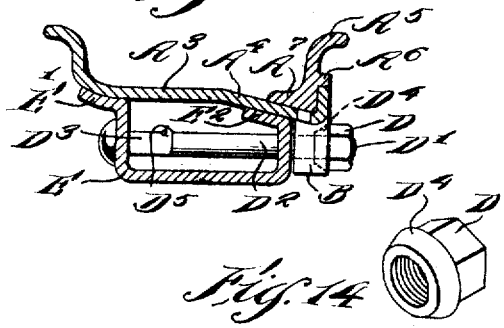
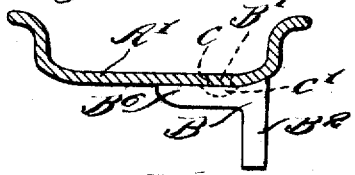

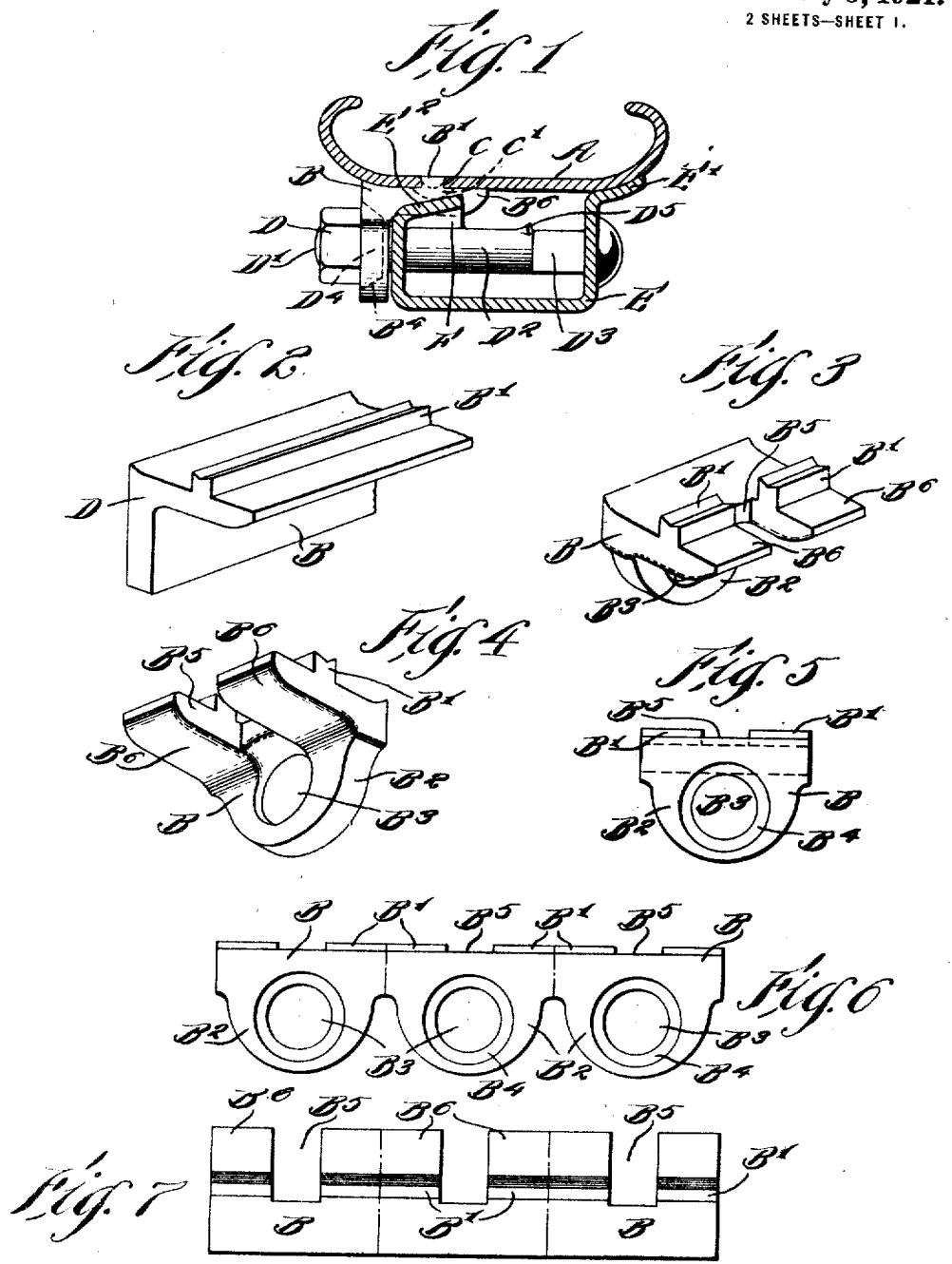

UNITED STATES PATENT OFFICE.

JAMES H. WAGENHORST, OF JACKSON, MICHIGAN.

DEMOUNTABLE RIM FOR AUTOMOBILE-WHEELS.

1,383,679.     Specification of Letters Patent.     Patented July 5, 1921.

Application filed June 11, 1919. Serial No. 303,527.

*To all whom it may concern:*

Be it known that I, JAMES H. WAGENHORST, a citizen of the United States, residing in the city of Jackson, county of Jackson, and State of Michigan, have invented certain new and useful Improvements in Demountable Rims for Automobile-Wheels, of which the following is a specification.

This invention is a demountable tire carrying rim for automobile wheels together with the fastening means for connecting the demountable carrying rim to the fixed rim of the wheel body.

The object of the invention is to provide an exceedingly simple, strong and durable form of fastening means which is capable of quick and easy manipulation and which will serve to accurately position the tire carrying rim upon the fixed rim of the wheel body. The invention also has for its object to provide certain novelties of construction whereby the cost of manufacture is materially decreased and at the same time the connecting features of the device materially strengthened.

With these and certain other objects in view, which will become apparent as the description proceeds, the invention consists in the novel features of construction, combination and arrangement, all of which will be more fully described hereinafter and pointed out in the appended claims.

In the drawings forming a part of this specification, Figure 1 is a view of a tire carrying rim having my novel form of clamp connected thereto; Fig. 2 is a detail perspective view of a portion of a bar from which a plurality of the clamps are made; Fig. 3 is a detail perspective view of one of the clamps before being attached; Fig. 4 is a view of said clamp taken from the opposite edge; Fig. 5 is side elevation of the clamp; Fig. 6 is a side elevation of a bar such as illustrated in Fig. 2 and showing the manner of cutting a plurality of clamps and boring the same with one operation; Fig. 7 is a top plan view of the bar after the second operation has been performed thereon showing the manner of bifurcating a plurality of clamps at one operation; Fig. 8 is an inverted plan view of a portion of the rim base, the inrolled bead being punched to receive the fastening lugs of the clamp; Fig. 9 is a sectional persepective showing the manner of connecting the clamp to the tire carrying rim and also showing an adjacent portion of the fixed rim to which the tire carrying rim is clamped; Fig. 10 is a side elevation showing a portion of the tire carrying rim secured by bolt and nut to the fixed rim of the wheel body; Fig. 11 is a detail sectional view of a tire carrying rim having a solid inwardly projecting bead instead of the inrolled bead shown in Figs. 1, 8 and 9; Fig. 12 is a sectional view of a straight side fixed rim with the inrolled bead, and clamp connected thereto; Fig. 13 is a detail sectional view of a fixed rim having a tire carrying rim mounted thereon, said tire carrying rim being provided with a quick detachable side ring; Fig. 14 is a detail view of the fastening nut.

In carrying out my invention I employ a tire carrying rim A which may be of the clencher type such as shown in Figs. 1, 9 and 11 or it may be of the straight side type as shown at $A'$ in Fig. 12 and $A^3$ in Fig. 13, this straight side type also embodying an inwardly depressed portion $A^4$ adapted to receive the quick detachable tire engaging ring $A^5$ having the shoulder $A^6$ which rides upon the outer edge of the rim and this ring is also provided with the foot piece $A^7$ which is adapted to fit into the depressed portion of the rim and provide a proper seat for the bead of the tire. To the tire carrying rim A, $A'$, $A^2$ or $A^3$ there are attached any desired number of clamps B, these clamps being permanently connected to the tire carrying rim in the special manner hereinafter set forth. The clamps are preferably right angular in shape, one leg thereof being secured in engagement with the base of the rim while the other leg thereof projects inwardly and is apertured to receive the fastening bolt and the leg which is secured against the base of the rim is preferably bifurcated in order to produce two separated engaging members which are adapted to engage depressions formed in the fixed rim hereinafter referred to. In order to quickly and securely connect the clamp to the base of the rim I preferably provide each clamp with the outwardly projecting lugs $B'$ which are adapted to be projected through the openings C punched in the inrolled bead $C'$ as shown in Figs. 8 and 9 or through the solid inwardly projecting bead $C^2$ illustrated in Fig. 11 or through the depressed portion $A^4$ of the rim illustrated in Fig. 13. These outwardly projecting lugs $B'$ after being passed through the openings or apertures C are headed down or riveted as shown most clearly in Fig. 9 thereby rigidly and securely fastening the clamp to the tire carrying rim. The inwardly projecting portion B² of the clamp is formed with the bolt hole B³ which is counterbored as shown at B⁴ and the other leg of the clamp is bifurcated as shown at B⁵ so as to provide spaced engaging members B⁶. In practice I prefer to construct the clamps from a bar or hot rolled section D shown in Fig. 2 and this bar is first operated upon to bore the holes, countersink them and then cut the contour of the inwardly projecting portion of the clamp. The bar is then turned over and the bifurcations B⁵ made therein and the clamps cut apart and after the edges of the engaging members B⁶ are rounded off the clamp is ready to be attached to the tire carrying rim, the base of which has been previously punched to receive the outwardly projecting lugs B' which as before stated are headed or riveted down thereby permanently and securely connecting the clamp to the rim. The bolt opening it will be noticed is arranged between the engaging members B⁶ and the outer face of this bolt opening is counterbored as shown to receive the tapered portion D⁴ of the nut D, this nut being screwed upon the threaded end D' of the bolt D² which is passed axially through the fixed rim E of the wheel body. This fixed rim E is of sheet metal and is channel shaped as shown, having the inwardly projecting flange E' upon the inner leg of said fixed rim, and the flange E² upon the outer leg of said rim, the outer side of the rim base being adapted to engage the flange E' while the inrolled bead C' or the solid bead C², or the depressed portion A⁴ of the rim is adapted to engage the other flange E². The legs of the fixed rim are formed with a series of bolt openings E³ and E⁴ through which the bolts D² are adapted to be passed and upon each side of the bolt opening E³ there are produced depressions F into flanges E³, these depressions being so spaced as to receive the members B⁶ of the clamps. By this arrangement a driving connection between the demountable rim and the fixed rim is secured and at the same time the bolt is arranged very close to the outer edge of the fixed rim thereby permitting the full binding force of the nut and bolt to be exerted upon the clamp. By having the bolt openings in the clamps counterbored and the nuts provided with tapering portions the parts will become properly centered or positioned as the nuts are fastened upon the bolts and by maintaining the clamps in their proper positions at all times, the proper coaction between the permanently attached lugs of the demountable tire carrying rim will properly function with the peculiarly constructed fixed rim of the wheel body so that the best results are obtained.

If desired the bolt D² may be formed with a non-circular portion D³ adjacent its head and which passes through a correspondingly shaped opening E⁴ in the leg of the fixed rim and at a suitable point a stop shoulder D⁵ may be provided after the bolt has been passed through the fixed rim. Then by pushing upon the nut when the same is being unscrewed the bolt can be fed outwardly the desired distance to release the nut and clear the ends of the bolt from the clamp so that the demountable rim can be tilted upon the fixed rim in order to remove the same.

It will thus be seen that I provide a novel construction of lug, and connect the same to the demountable tire carrying rim in a novel manner, and also that this particular construction of clamp coacts with the novel form of fixed rim and accomplishes the purpose of quickly, easily and securely fastening the tire carrying rim to the fixed rim of the wheel body.

Having thus described my invention, what I claim is:

1. The combination with a channeled fixed rim, the outer leg of said fixed rim having depressions at definite points, of a demountable tire carrying rim having an inrolled bead, said bead being apertured at definite points, clamps having outwardly projecting lugs passed through said apertures and riveted to the rim, bolts passing through the fixed rim and clamps, and nuts upon the ends of said bolts.

2. The combination with a fixed rim having differential legs, of a plurality of bolts passing transversely through said fixed rim, the outer leg of said fixed rim being pressed inwardly where said bolts pass through said rim, a demountable tire carrying rim having an inrolled bead, a plurality of apertured clamps connected to the base of said rim, the bolts passing through said clamps, said clamps engaging the inpressed portions of the fixed rim, and nuts upon the ends of said bolts.

3. The combination with a demountable tire carrying rim having an inrolled bead, said inrolled bead having an aperture produced therein, of an apertured clamp having an outwardly extending lug passing through the apertured portion of the inrolled bead and riveted thereto.

4. The combination with a fixed rim having bolt holes and depressions upon either side of each bolt hole, of a demountable rim having clamps each provided with depression engaging members and also having a bolt hole.

5. The combination with a tire carrying rim having clamps rigidly attached thereto, of a channeled fixed rim having a plurality of bolt holes and depressions in the outer leg of the fixed rim on opposite sides of each bolt hole, one portion of each clamp having spaced members adapted to engage said depressions, the other portion of said clamp having a bolt opening, together with bolts and nuts to connect the parts together.

6. The combination with a fixed rim having a plurality of bolt holes and a depression in said fixed rim upon opposite sides of each of said bolt holes, of bolts passing through said fixed rim and having each a non-circular portion adjacent its head, a tire carrying rim having clamps permanently connected thereto, each clamp having a bolt aperture in one portion thereof, the other portion of said clamp being adapted to engage the depressions of the fixed rim, and nuts upon the end of said bolts adapted to engage said clamps.

7. A tire carrying rim having an inwardly projecting bead, said bead being apertured at definite points, and a clamp having outwardly projecting lugs passed through said bead apertures and riveted to the rim, said clamp having a bolt receiving aperture.

8. A tire carrying rim having an inwardly projecting bead said bead being apertured at definite points, and a clamp having outwardly projecting lugs passed through said bead apertures and riveted to the rim, said clamp having a bolt receiving aperture and also provided with a member adapted to engage a depression in the leg of a fixed rim.

9. The combination with a tire carrying rim having an inrolled bead apertured at definite points of clamps having outwardly extending lugs projected through the apertures in the bead and riveted to the rim, the inwardly projecting portion of said clamp having a countersunk bolt opening.

10. The combination with a channeled fixed rim having bolt openings at definite intervals, the outer leg of said fixed rim being depressed upon opposite sides of each bolt opening, of a demountable tire carrying rim adapted to fit upon said channeled fixed rim, said demountable rim having clamps rigidly connected thereto, each clamp having a bolt opening adapted to register with the bolt opening in the fixed rim and having spaced members adapted to engage the depressions upon opposite sides of the bolt openings in the fixed rim together with bolts and nuts to secure the parts together.

11. A tire carrying rim, having its base apertured at definite points, and clamps having outwardly projecting lugs passed through said apertures in its base and riveted to said rim base, each clamp having a bolt receiving aperture.

12. The combination with a fixed rim of bolts extending transversely therethrough, a tire carrying rim having clamps connected thereto, said clamps having bolt apertures, the outer edges of which are counterbored, and nuts screwed upon the ends of the bolts, said nuts having tapered portions engaging the counterbored edges of the bolt openings in the clamps.

JAMES H. WAGENHORST.